US004001648B2

United States Statutory Invention Registration [19]

[11] Reg. Number: H1648

Kim

[45] Published: May 6, 1997

[54] METHOD FOR STORING AND REGENERATING PHOTOGRAPHIC PROCESSING SOLUTIONS

[76] Inventor: Hongzoon Kim, c/o Fuji Hunt Photographic Chemicals, 25 Commerce Dr., Allendale, N.J. 08401

[21] Appl. No.: 478,016

[22] Filed: Jun. 7, 1995

[51] Int. Cl.[6] ..... G03C 3/00

[52] U.S. Cl. ..... 430/398

[58] Field of Search ..... 430/398, 399, 430/400; 354/324, 331, 336

[56] References Cited

U.S. PATENT DOCUMENTS

| | | | |
|---|---|---|---|
| 5,071,734 | 12/1991 | Ueda et al. | 430/399 |
| 5,318,061 | 6/1994 | Saito | 354/324 |
| 5,351,103 | 9/1994 | Komatsu et al. | 354/324 |
| 5,402,196 | 3/1995 | Ishida et al. | 354/324 |
| 5,416,551 | 5/1995 | Ishikawa et al. | 354/324 |
| 5,432,583 | 7/1995 | Ishikawa et al. | 354/324 |
| 5,446,516 | 8/1995 | Burbury et al. | 354/298 |
| 5,460,926 | 10/1995 | Komatsu et al. | 354/324 |
| 5,466,563 | 11/1995 | Ishikawa et al. | 430/400 |

FOREIGN PATENT DOCUMENTS

| | | | |
|---|---|---|---|
| 0173203 | 3/1986 | European Pat. Off. . | |
| 0178539 | 4/1986 | European Pat. Off. | 430/399 |
| 0416585 | 3/1991 | European Pat. Off. | 430/399 |
| 0530889 | 3/1993 | European Pat. Off. . | |
| 61-213849 | 9/1986 | Japan | 354/331 |
| 63-202741 | 8/1988 | Japan | 430/399 |
| WO9107698 | 5/1991 | WIPO . | |
| 91/07699 | 5/1991 | WIPO | 430/399 |
| 91/15806 | 10/1991 | WIPO | 430/399 |
| 91/17478 | 11/1991 | WIPO | 430/400 |
| 93/08507 | 4/1993 | WIPO | 354/324 |

OTHER PUBLICATIONS

Patent Abstracts Of Japan, vol. 5, No. 81 (P-63 (753), Jul. 25, 1981 & JP-A-56027142 (Fuji Shashin Film KK) Mar. 16, 1981 -Abstract Only.

*Primary Examiner*—Charles T. Jordan
*Assistant Examiner*—Meena Chelliah
*Attorney, Agent, or Firm*—Robert G. Mukai; Burns, Doane, Swecker & Mathis

[57] ABSTRACT

A method for storing and reusing a photographic processing solution, and in particular an overflow developing solution, comprises contacting a processing solution which has been removed from a processing bath, in a storage vessel, with an effective amount of a preservative so as to prevent any substantial degradation in activity of the processing solution during a storage period. The solution then exits the storage vessel and is preferably reintroduced into the processing bath from which it was removed after treatment to increase the activity thereof, e.g., regeneration and/or removal of deleterious by products.

25 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR STORING AND REGENERATING PHOTOGRAPHIC PROCESSING SOLUTIONS

BACKGROUND OF THE INVENTION

1. Field of the Invention

The invention relates to a method of storing and recycling photographic processing solutions, and in particular, to a method for recycling process overflow solutions in a preserved condition.

2. Description of the Related Art

During the processing of silver halide photographic elements, the "working" baths typically require replenishment to replace exhausted, evaporated and/or photographic element entrained components.

The degradation of processing solutions occurs as a result of repeated participation in photographic development, fixing, and/or bleaching; and inadvertent oxidation phenomenon. Additionally, the activity of the processing baths such as the developer bath can be inhibited due to contamination attributable to the accumulation of compounds, predominantly halides, which have been inadvertently leached from the photographic film element.

When a replenisher is introduced into a working bath, a corresponding mass-volume in the working bath will typically be displaced as overflow. As a result, steps must be taken to handle the displaced solution. Moreover, the amount of overflow can be considerable, particularly in a large photographic processing facility.

In the past, and in order to simplify the problem of treating and handling the developer overflow, exhausted developer overflow was typically discharged to a drain or collected for waste disposal. For example, see U.S. Pat. No. 5,063,141.

However, ever-increasingly stringent environmental regulations have compelled far more conscientious approaches in the handling of developer overflow. As a result, developer recycling is now practiced to a greater extent than in former years. In this regard, developer recycling involves treatment of the recycled material prior to reuse. This treatment can involve either regeneration, i.e., the addition of fresh chemicals to the solution, or purification, i.e., removal of deleterious byproducts, e.g., halides, from the solution.

Unfortunately, there are certain limitations to the present practices that make recycling unattractive. For example, there is the difficulty to optimize recycle rates for process solutions that achieve no waste discharge and at the same time avoid the buildup of critical levels of oxidation products and extractives from photographic material that degrade processing. The situation is especially critical where there is low volume turnover (or lower utilization) in small scale photographic processing facilities.

Another approach to the problem of handling overflow has been to severely reduce or prevent developer overflow altogether, and, thus, preclude the need to handle developer overflow. In this regard, attempts have been made to reduce the amount of developer overflow created by careful manipulation of the process protocol, e.g., adjusting the developer bath temperature, in order to possibly accomplish processing at a reduced developer replenishment rate. For example, see U.S. Pat. No. 5,068,170.

Other related proposals have been made to eliminate developer overflow altogether by careful monitoring and maintaining of specific developer/replenisher compositions in the primary tank and as used in conjunction with a prescribed photographic composition. For example, see U.S. Pat. Nos. 4,997,749 and 5,004,676.

Of course, these approaches for reducing overflow only allow for developer replenishment equal to the relatively small amounts of developer bath lost to evaporation or entrainment on the photographic material. Moreover, these past approaches for reducing (if not eliminating) developer overflow are not without their drawbacks. Namely, these past approaches are largely unsatisfactory because they impose severe constraints on development bath protocol and compositions, and even on the type of photographic film and paper that can be processed in the development bath. These sacrifices in the versatility of the development bath are not acceptable in many circumstances.

In view of the foregoing, some recognition has emerged in the art regarding the design of improved systems for recycling used developer solution. For example, see U.S. Pat. Nos. 5,057,858 and 4,983,504.

Moreover, the reuse of other processing liquids has also been recently addressed. For instance, a bleach-fix regeneration kit that was recently disclosed in U.S. Pat. No. 5,055,382 addresses the need to reuse bleach-fix solutions.

The difficulties associated with handling of overflow solutions are particularly apparent in the area of "one hour" development, i.e., mini-labs. In fact, chemicals used in the one hour film development processing market are typically added to the process "as necessary", or even automatically, and the overflow chemical is usually discarded as unusable.

In fact, at most mini-labs, multiple solutions are typically introduced into a single overflow container. Thus, most mini-labs are not currently constructed to collect and reuse the overflow because such an undertaking would require a separate collection tank for each chemical to be reused.

Recent advances in chemical technologies have made it easier for mini-labs to consider recycling the overflow solutions. However, despite these efforts the art has been largely unable to provide a facile, cost-effective method to recycle most, if not all of one or more photographic processing solutions, and particularly developer overflow solution caused by replenishment.

SUMMARY OF THE INVENTION

Among other things, the present invention seeks to provide a method for storing photographic processing solutions which is capable of preventing any substantial degradation of the solution during storage. Such a process allows for reuse of the processing solution, while significantly reducing or even completely eliminating the need to discharge degraded overflow solutions to a drain, waste collection, and/or waste treatment.

Accordingly, in one aspect, the present invention relates to a method for storing a processing solution from a photographic processing bath in a preserved condition. In particular, the process comprises:

(a) introducing a replenishing solution into a processing bath in a photographic processing system;

(b) introducing an overflow solution from the processing bath into a storage vessel and contacting the overflow solution with an amount of a preservative that is effective to preserve the solution against further degradation for a storage period, and (c) treating the stored solution so as to increase the activity thereof and reusing the treated solution at the end of the storage period.

In one preferred aspect, the stored solution is reintroduced into the working bath of the color photographic processing system from which it was removed. Furthermore, the treatment can involve the addition of replenishing amounts of fresh chemicals to the solution before reintroduction of the solution into a working bath.

The present invention can be better understood from the following description of preferred embodiments of the present invention particularly when considered in conjunction with the accompanying drawings.

DETAILED DESCRIPTION OF PREFERRED EMBODIMENTS OF THE INVENTION

Figure 1A:
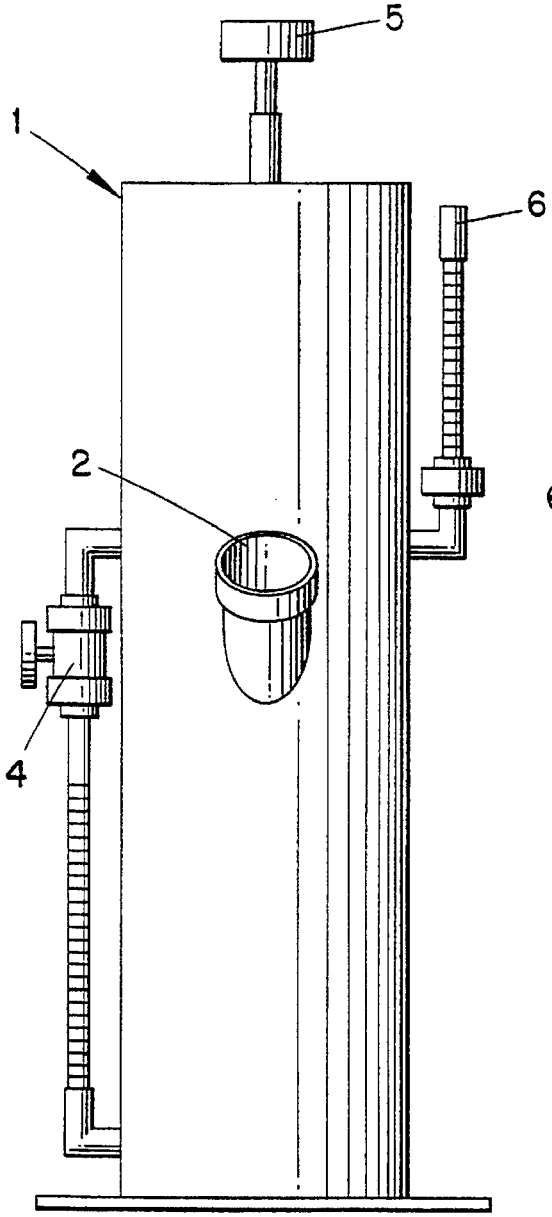
FIGS. 1A and 1B are front and rear views respectively of a storage vessel which can be employed in the present invention.

One facet of the present invention relates to the discovery of a heretofore unrecognized problem, i.e., that overflow solutions can suffer rapid and substantial further degradation while stored in a recycling system prior to reuse.

In other words, there was no recognition nor understanding of the unexpectedly pronounced and accelerated degradation problems which can occur during recycling and storage of exhausted processing solutions such as developer solutions.

Although this "overflow degradation" phenomenon is not yet completely understood, and not desiring to be bound by any theory, it is believed that the rapid degradation of the overflow during a dwell period in the overflow storage vessel is attributable to the increase of the ratio of surface area to bulk volume which the overflow experiences while accumulating and remaining in the overflow tank while it awaits reuse. As a typical consequence, only a fraction of the total overflow could be re-used in the prior recycle systems.

The present invention can solve this problem by contacting the overflow with an effective amount of a preservative, i.e., an amount effective to prevent further decomposition of the solution while in the overflow storage vessel.

In general, the precepts of the present invention are applicable to photographic processing systems customarily used for processing of light-sensitive silver halide color photographic materials. Moreover, although the following discussions focus on certain preferred embodiments of the invention, e.g., color developing solutions, the process of the present invention can also be effectively employed with other photographic processing solutions such as fixing, and bleach-fixing solutions. In fact, any photographic processing solution recognized in the art which is subject to the accumulation of byproducts in quantities sufficient to cause degradation in processing performance can be effectively employed in the present invention.

Moreover, the process can be employed in conjunction with any art-recognized photographic processing system including mini-labs. Such processing systems typically include developing baths, bleaching baths, fixing baths and/or bleach-fixing baths, as well as washing and/or stabilizing baths, and the like.

In addition, the process of the present invention can be employed with photographic processing systems that undergo an "irregular" operation, i.e., where there can be significant periods of idle time between the processing of photographic elements. This idle time can be on the order of from minutes to hours or even days.

Irrespective of the system employed (or its frequency of operation), the process involves the storage of an exhausted processing solution, e.g., a developing solution, a fixing solution, or a bleach-fixing (or blixing) solution.

Developing solutions suitable for use in the present invention include art-recognized components such as color developing agents, pH buffers, preservatives, development inhibitors, fog inhibitors, as well as other art-recognized additives such as organic solvents, chelating agents, fogging agents, development accelerators and the like.

The color developer employed in the present invention is preferably an alkaline aqueous solution comprising an aromatic primary amine color developing agent. The preferred color developing agents are amino phenol compounds, preferably a p-phenylenediamine compound.

Examples of suitable p-phenylenediamine compounds include 3-methyl-4-amino-N,N-diethylaniline, 3-methyl-4-amino-N-ethyl-N-β-hydroxyethylaniline, 3-methyl-4-amino-N-ethyl-β-methanesulfonamideethylaniline, 3-methyl-4-amino-N-ethyl-N-β-methoxyethylaniline, and sulfates, hydrochlorides and p-toluenesulfonates thereof. The color developing agents can be used alone or in combinations thereof.

In one particular preferred embodiment, the color developing agent employed is CD-3, i.e., color developer 3; 4-[N-ethyl-N-2-methanesulfonyl-amidoethyl]-2-methyl phenylenediamine sesquisulfate monohydrate, CAS no. 25646-71-3.

As discussed above, the color developer can further include a pH buffer such as a carbonate, borate, or phosphate of an alkaline metal; a development inhibitor or fog inhibitor such as alkali metal halides or organic antifoggants such as benzimidazole, benzotriazole and mercapto compounds; organic solvents such as ethylene glycol and diethylene glycol; development accelerators such as benzyl alcohol, polyethylene glycol, quaternary ammonium salts and amines; dye-forming couplers; competing couplers; fogging agents such as sodium boron hydride; auxiliary developing agents such as 1-phenyl-3-pyrazolidone; thickening agents; chelating agents such as aminopolycarboxylic acid, aminopolyphosphonic acid, alkylphosphonic acid and phosphonocarboxylic acid and salts thereof. However, it is preferred that the color developer contains substantially no benzyl alcohol, i.e., contains 2 ml or less of benzyl alcohol per liter of developer.

Furthermore, the color developer can include preservatives such as a hydroxylamine to retard aerial oxidation. Specific examples of suitable preservatives include hydroxylamines and its derivatives including alkylhydroxylamines such as diethylhydroxylamine. Other useful preservatives include phenylsemicarbazide; triethylene-diamine (1,4-diazabicyclo[2,2,2]octane); sulfites; hydrazines such as N-N-dicarboxylmethyl-hydrazine, sulfoethylhydrazine and sulfopropylhydrazine; alkanol amines such as ethanolamine, diethanolamine, and triethanolamine, catechols such as catecholsulfonic acid, sulfinates such as p-toluenesulfinate; phosphites such as sodium phosphite; piperazines; saccharides such as glucose; and the like.

Such preservatives are typically present in an amount of from 0.1 grams to 30 grams per liter, preferably from 0.5 to 15 grams per liter, of developer.

As mentioned previously, the process of the present invention can find use with other processing solutions such as bleach-fixing solutions, and fixing solutions. Once again, such solutions are well recognized in the art and thus, need not be described in detail here.

However, for the sake of completeness, bleaching solutions and/or bleach-fixing solutions suitable for use in the present invention can include art-recognized bleaching agents such as organic complexes of iron (III); organic acids such as citric acid, tartaric acid, or malic acid; persulfates, or hydrogen peroxide.

The bleaching solution, and/or the bleach-fixing solution may also contain one or more bleaching accelerators. Such compounds are also well recognized in the art and include mercapto group- or disulfido bond-containing compounds such as those described in U.S. Pat. No. 3,893,858, thiourea compounds such as those disclosed in U.S. Pat. No. 3,706,561, as well as halides such as iodides or bromides.

Similarly, the bleach-fixing and/or fixing solution employed in the present invention can include any art-recognized fixing agent. Suitable examples of such fixing agents include water-soluble silver halide solubilizers, e.g., thiosulfates such as sodium thiosulfate or ammonium thiosulfate; thiocyanates such as sodium thiocyanate or ammonium thiocyanate; thioethers and thioureas.

Bleach-fixing and/or fixing solutions may further contain various buffers, brightening agents, defoaming agents, chelating agents, fungicides or surfactants as well as organic solvents such as polyvinyl pyrrolidone or methanol.

The bleach-fixing solution or fixing solution may further contain preservatives including sulfite-ion releasing compounds such as sulfites, bisulfites, or metabisulfites. Such preservatives are preferably incorporated into the fixing and/or bleaching-fixing solution in an amount of approximately 0.02 to 0.5 mols per liter, more preferably about 0.04 to 0.4 mols per liter calculated as sulfite ion.

Subsequent to fixation and/or bleach-fixation, the processing system may include a water-rinsing and/or stabilization bath. Such baths are also well recognized in the art and as such, need not be described in detail here.

To aid in control of the composition so as to maintain consistent product performance and prevent over concentration effects, evaporation in the process baths can be prevented by one or more art recognized techniques, e.g., floating lids, closed loop specific gravity sensors, automatic water feeds based on specific gravity, photographic film or paper feed rate, controlled replenishment and the like.

After a processing solution, e.g., the working color developing bath solution, is repetitively used over an extended period of time, the "active" components, such as the color developing agent in the developing solution, undergo a so-called "exhaustion" and/or become "consumed". Accordingly, the activity of the solution is decreased.

Furthermore, as mentioned previously, the activity of the solution may also be diminished as a result of oxidation or "carry out", i.e., entrainment by the photographic film conveyed therethrough. As a result of one or more of these effects, the activity of the working solution decreases as a function of use and time in the absence of replenishment.

The present invention relates to the storage and, preferably, the reuse of solutions in which the activity has decreased, and in particular, overflow solutions.

In one embodiment, the present invention relates to the storage of overflow solutions removed from a processing bath. For example, such overflow solutions can be displaced from a processing bath by the introduction of a replenishing solution. In this regard, the introduction of a predetermined mass-volume of replenishing developer will effectively displace a corresponding mass-volume of a working solution as overflow (neglecting carry out, i.e., that mass-volume entrained in a photographic material being processed within the solution, or evaporation). However, the exact technique for solution removal is not critical and any art-recognized technique for such removal can be employed with the invention.

It should be further noted that the amount of replenisher introduced into the working bath and/or the amount of overflow solution removed from the bath is not critical to the present invention. Quite clearly, the amount varies depending upon the particular processing system. However, while dependent on the process employed, typical amounts of replenisher for a developing bath are about 6 to 200 ml/ft$^2$, while typical amounts of replenisher for a bleaching-fixing or a fixing bath are about 5 to 200 ml/ft$^2$.

The overflow solution is introduced into a storage vessel where it contacts one or more preservatives. In this regard, any suitable storage vessel can be employed within the process of the present invention. For example, suitable material of construction for such vessels can include polyvinyl chloride or the like.

Any art-recognized preservative can be effectively employed in the inventive process.

Specific examples of suitable preservatives for color developing solutions include hydroxylamines and its derivatives including alkylhydroxylamines such as diethylhydroxylamine.

Other preservatives includes phenylsemicarbazide; triethylene-diamine (1,4-diazabicyclo[2,2,2]octane); sulfites; hydrazines such as hydrazine diacetate, N-N-dicarboxylmethylhydrazine, sulfoethylhydrazine and sulfopropylhydrazine; alkanol amines such as ethanol amine, diethanol amine, and trierhanol amine; pH buffers; catechols such as catecholsulfonic acid, with N,N-diethylhydroxylamine, triethanolamine and hydrazine diacetate being preferred. However, other art-recognized developer preservatives can also be used in this process.

When fixing and/or bleach-fixing solutions are being reused, suitable preservatives include ammonium or alkali metal thiosulfates and/or sulfite-ion producing compounds. Specific examples of suitable preservatives in this embodiment of the invention include ammonium or alkali metal thiosulfates such as sodium thiosulfate, sulfites such as sodium sulfite, potassium sulfite and ammonium sulfite; bisulfites such as ammonium bisulfite, sodium bisulfite, and potassium bisulfite; and metabisulfites such as potassium metabisulfite, sodium metabisulfite, and ammonium metabisulfite.

The preservative(s) can be added to the storage vessel either alone, or, alternatively, together with other compounds as a blended additive. Preferably, the preservative is introduced as a solution which also includes cosolubilizers, chelates, and other optional process solution components which are recognized within the art.

The overflow solutions are contacted with preservative(s) in an amount effective to prevent any significant degradation in activity of the processing solution over the storage period.

The storage period is clearly dependent on a number of factors including the nature of the processing solution, i.e., developing, fixing, or bleach-fixing, and the like. Storage times can vary but can typically be on the order of 2–6 weeks.

Effective preservative concentrations for use with developer solutions are generally in a range of about 1 g/l to 10 g/l, preferably in a range of about 2 g/l to 5 g/l, per 3.5 g/l of color developer agent, present in the developer overflow solution.

For example, where hydroxylamine is employed the concentration is preferably about 0.05 M/l to 0.2 M/l per 0.01 M/l of color developing agent. Similarly, where hydrazine is used, the concentration is about 0.005 M/l to 0.2 M/l per 0.01 M/l of color developing agent present. Further, where an alkylhydroxylamine is used a concentration of about 0.001 M/l to about 0.1 M/l per 0.01 M/l of color developing agent is preferred.

Furthermore, effective sulfite preservative concentrations for use with color fixing and/or bleach-fixing solutions are generally in the range of 0.9 M/l to 0.23 M/l, preferably, about 0.12 M/l to about 0.18 M/l per 0.5 M/l of thiosulfate fixing and/or bleach-fixing agent present in the solution.

In order to guarantee that the overflow solution is in contact with the preservative, at least a portion of the preservative should be introduced into the storage vessel prior to introduction of processing solution. Preferably, all of the preservative is introduced prior to introduction of the overflow solution.

It is, of course, apparent that in such a sequence, the initial concentration of preservative would be greater (likely far greater) than that necessary to prevent degradation. However, under normal operating conditions, the concentration of preservative would be maintained at effective levels throughout the storage period.

After holding the overflow solution in the storage vessel for the storage period, the solution is then reused. For example, it can be reintroduced into the processing bath from which it was removed, introduced into another developing system bath or even taken "off site" for further treatment and/or processing.

In the preferred use of the invention with the irregular operation of processing systems, the processing bath can be directly reintroduced into the bath from which is was removed, thus allowing for efficient and effective reuse of the various processing solutions employed therein.

Preferably, prior to reuse of the solution, the solution is suitably treated so as to increase the activity thereof. In this regard the exact extent to which activity is increased is not critical to the present invention. However, it is preferred that the activity be raised to a level sufficient to allow the solution to be employed as a replenishing solution. Moreover, this treatment can be performed by techniques which are recognized in the art. For example, such treatment can involve regeneration, i.e., the addition of fresh components to the solution, and/or purification, i.e., removal of deleterious by-products therefrom.

In particular, effective regenerating amounts of fresh components for the particular overflow solution can be introduced prior to reuse of the solution. Suitable means for accomplishing this, i.e., pumping, filtering, and admixing fresh chemicals into the outflow of a overflow solution from the storage vessel, are disclosed in, for example, U.S. Pat. No. 5,057,858.

Similarly, other techniques recognized in the art, such as the removal of deleterious halides and other by products, e.g., especially bromides, can be employed. These techniques can utilize conventional means, e.g., halides can be removed by ion exchange resins or using a dialysis apparatus, as described in U.S. Pat. No. 5,004,676.

One particularly preferred embodiment of the present invention can be described in greater detail by reference to the illustrative figures.

Figure 1B:
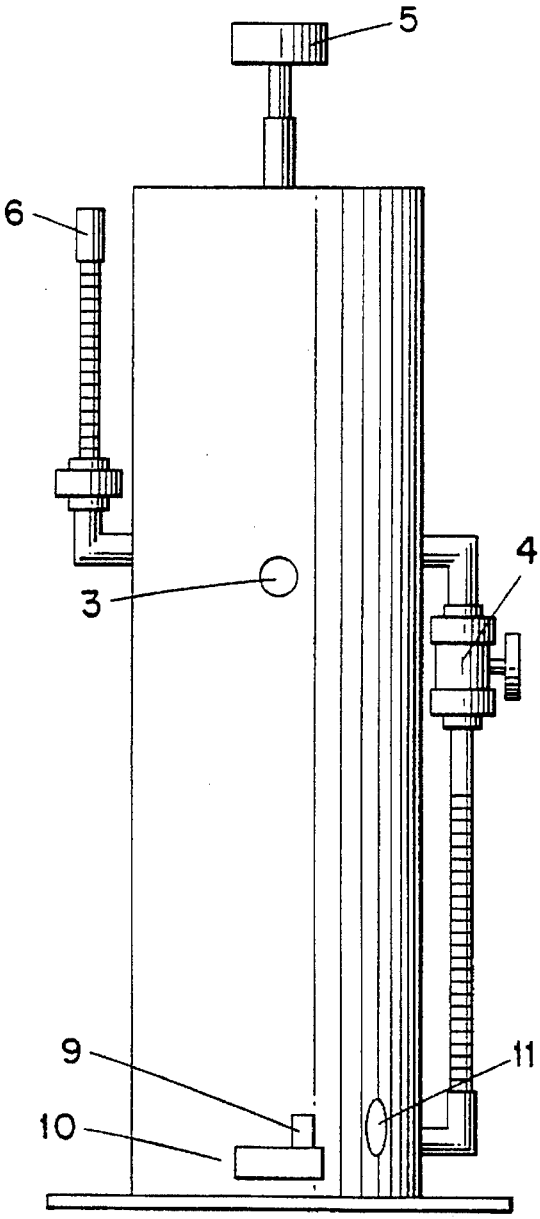

As illustrated in FIGS. 1 and 2, the vessel unit 1 includes a pair of inlets, inlet 2 and inlet 3. Inlet 2 is for introducing replenisher and regeneration chemicals into the lower replenisher vessel 8; Inlet 3 is for introducing overflow into the upper storage vessel 7.

The unit further includes a one-way valve 4 fluidly connected to both the upper and lower vessel and which controls flow between upper storage vessel 7 and lower replenisher vessel 8; a mixing means, e.g., mix-handle 5, for agitating the contents of tank 8 and overflow discharge 6. The exact type of valve and/or mixer is not critical to the present invention as long as it is capable of performing the function described above.

In addition, the unit can include an outlet 9 and drain valve 10 as well as a level sensor 11. The outlet 9 is fluidly connected to suitable pumping means (not shown) for returning replenished solution to the working tank. The particular pumping means and level sensor employed are also not critical to the invention. Accordingly, any art-recognized means for performing such functions can be employed.

Figure 2A:
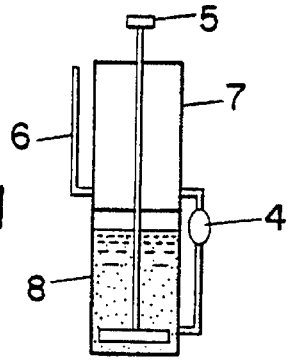
FIGS. 2A–2D are cross-sectional views of a vessel and illustrate one manner of usage.

An exemplary scheme of using the vessel unit of FIG. 1 is illustrated in FIG. 2 as follows:

First, an effective amount of preservative is initially added to upper storage vessel 7. The lower replenisher vessel 8 is filled with replenishing solution. FIG. 2A.

Figure 2B:
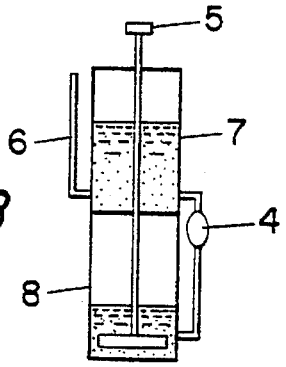

Next, the replenisher is introduced into the working bath and, when the replenisher rate exceeds the carry out rate, an overflow solution is created which overflow is directed to the storage vessel. The upper storage vessel 7 fills through inlet 2 with overflow solution which blends with the preservative. FIG. 2B.

Figure 2C:
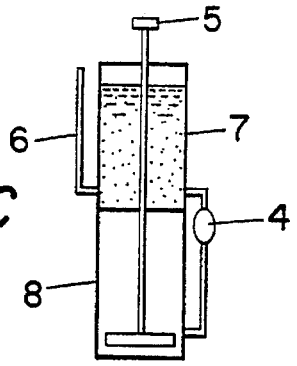

When the replenishment vessel 8 is empty, a low replenisher solution alarm is signalled. Then, the valve 4 is adjusted to the transfer (or open) position. FIG. 2C.

After the overflow has been completely transferred to the replenisher tank, the valve 4 is returned to the collect (or closed) position.

Figure 2D:
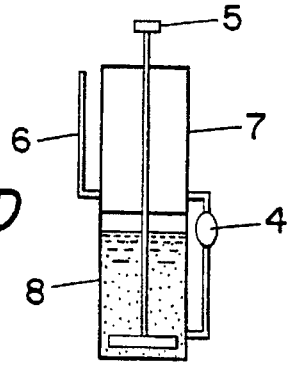
Figure 3A:
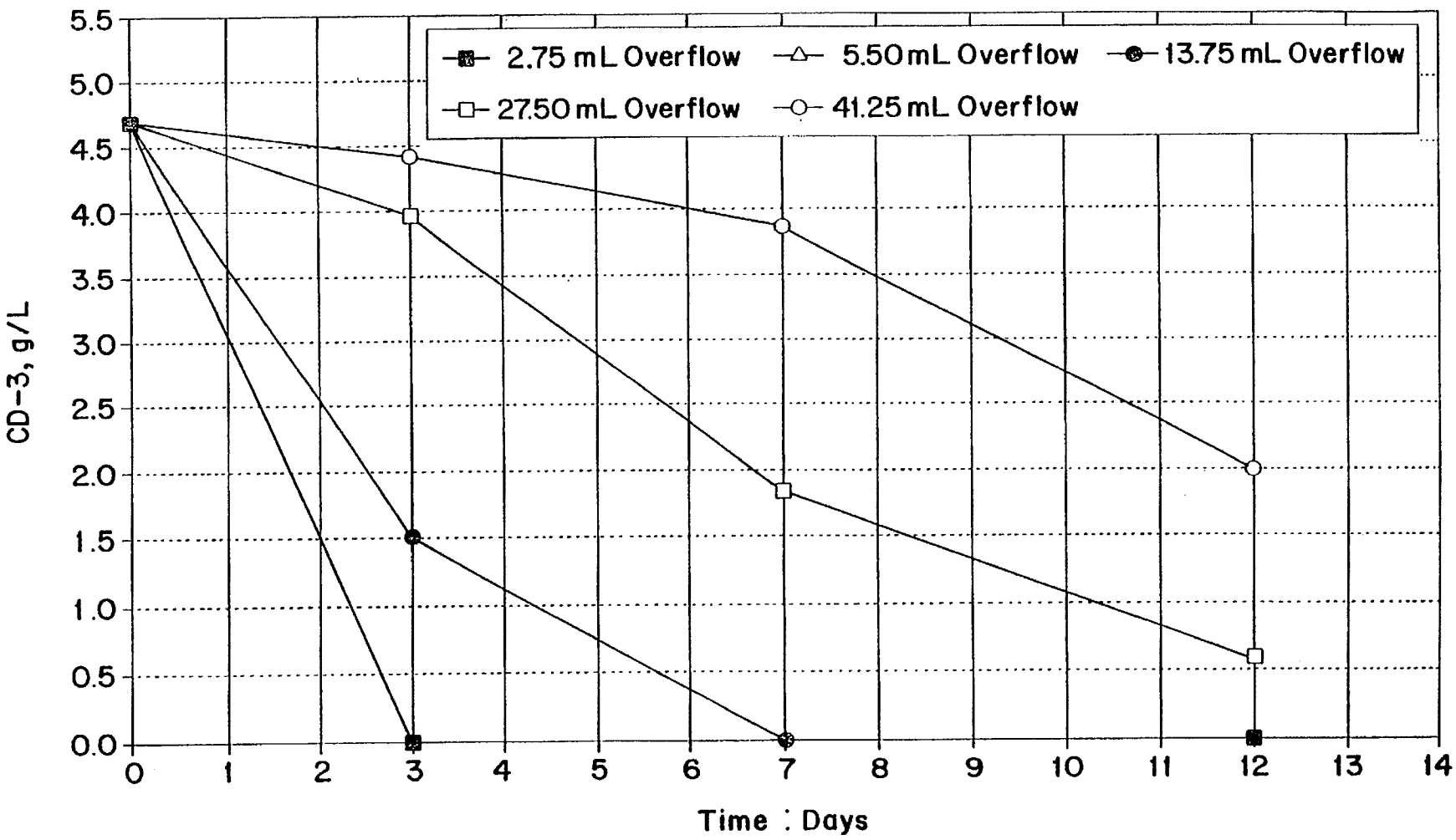
FIGS. 3A–3D illustrate the results associated with the Example set forth herein.
Figure 3B:
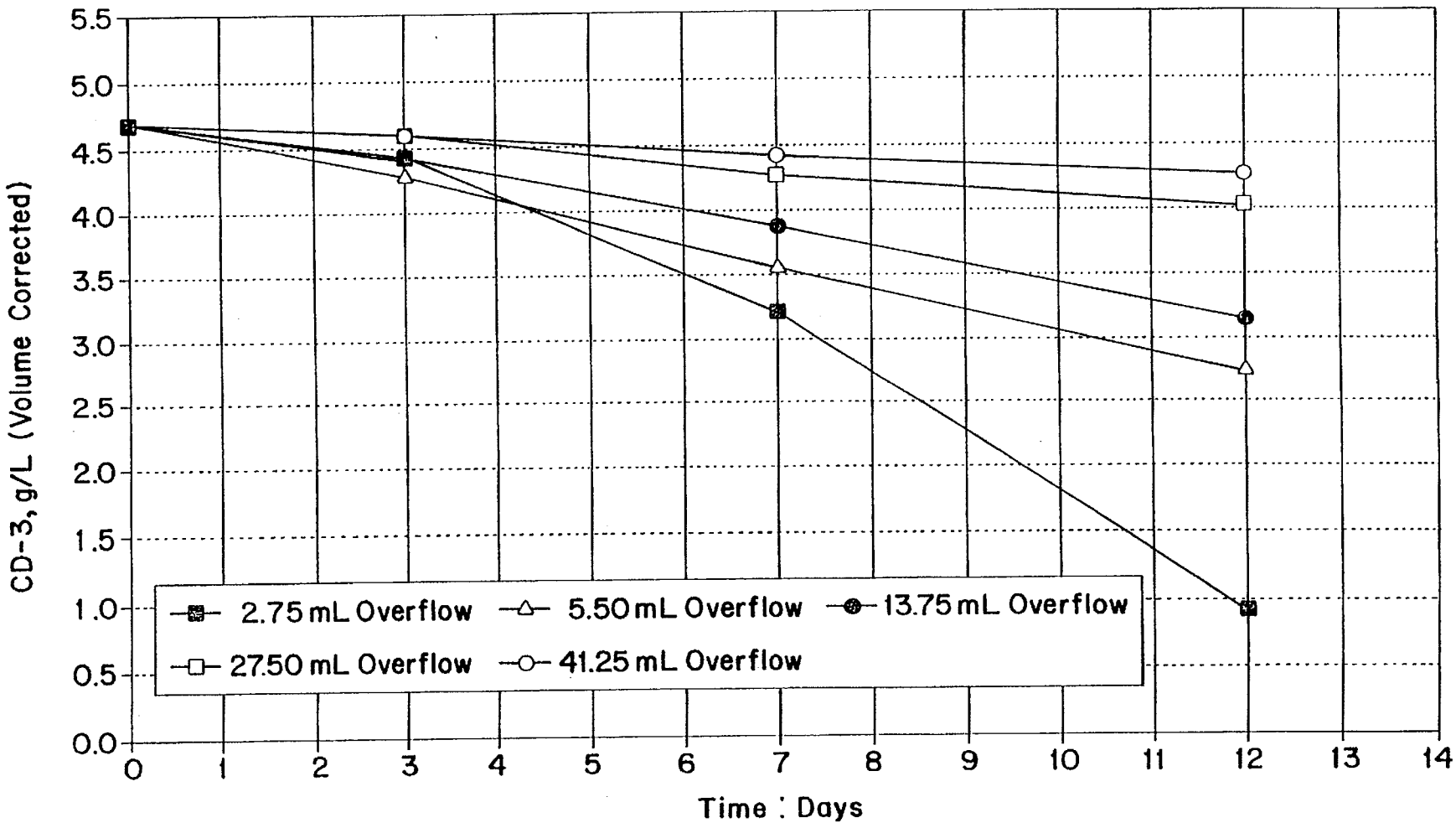
Figure 3C:
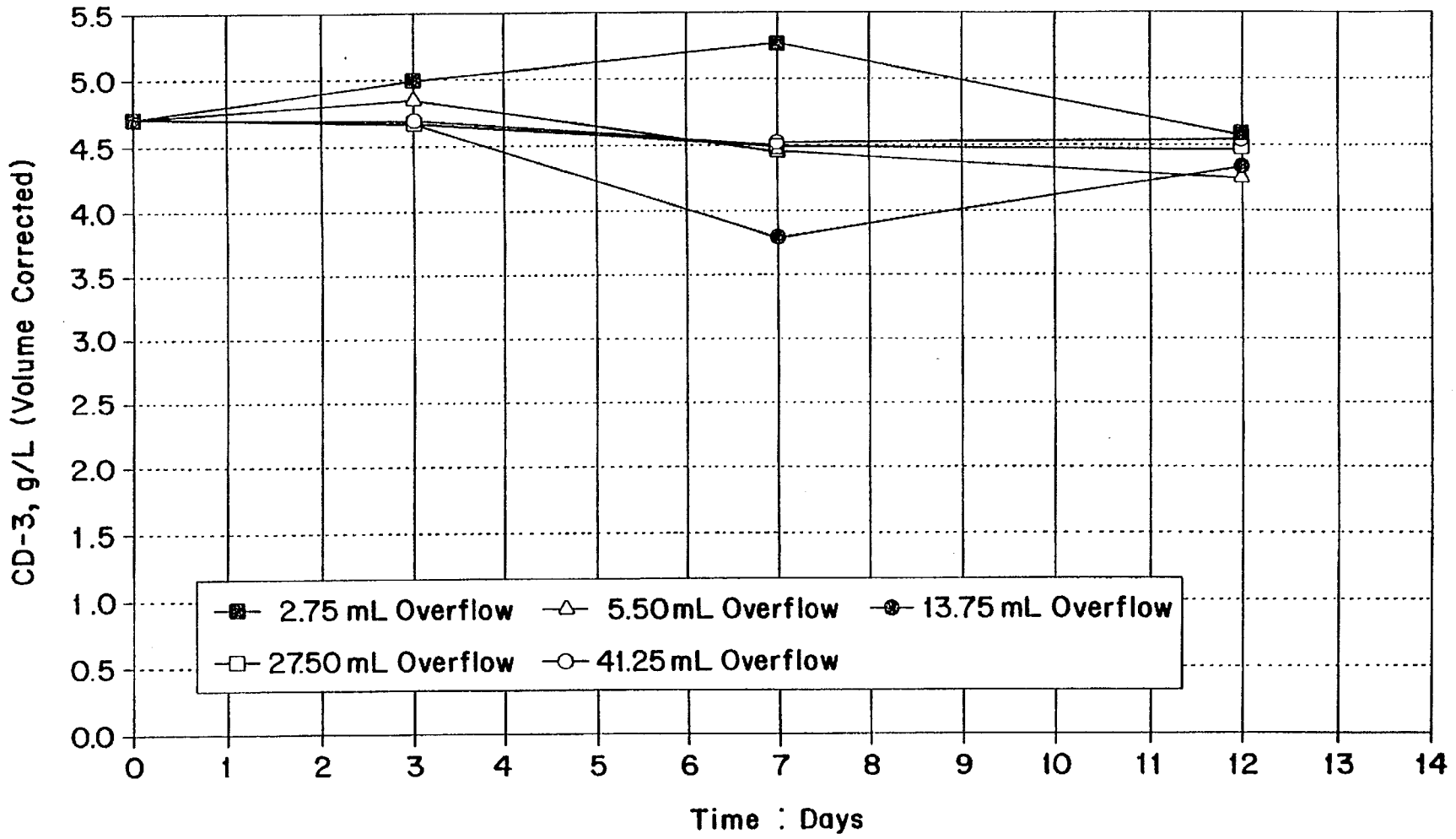
Figure 3D:
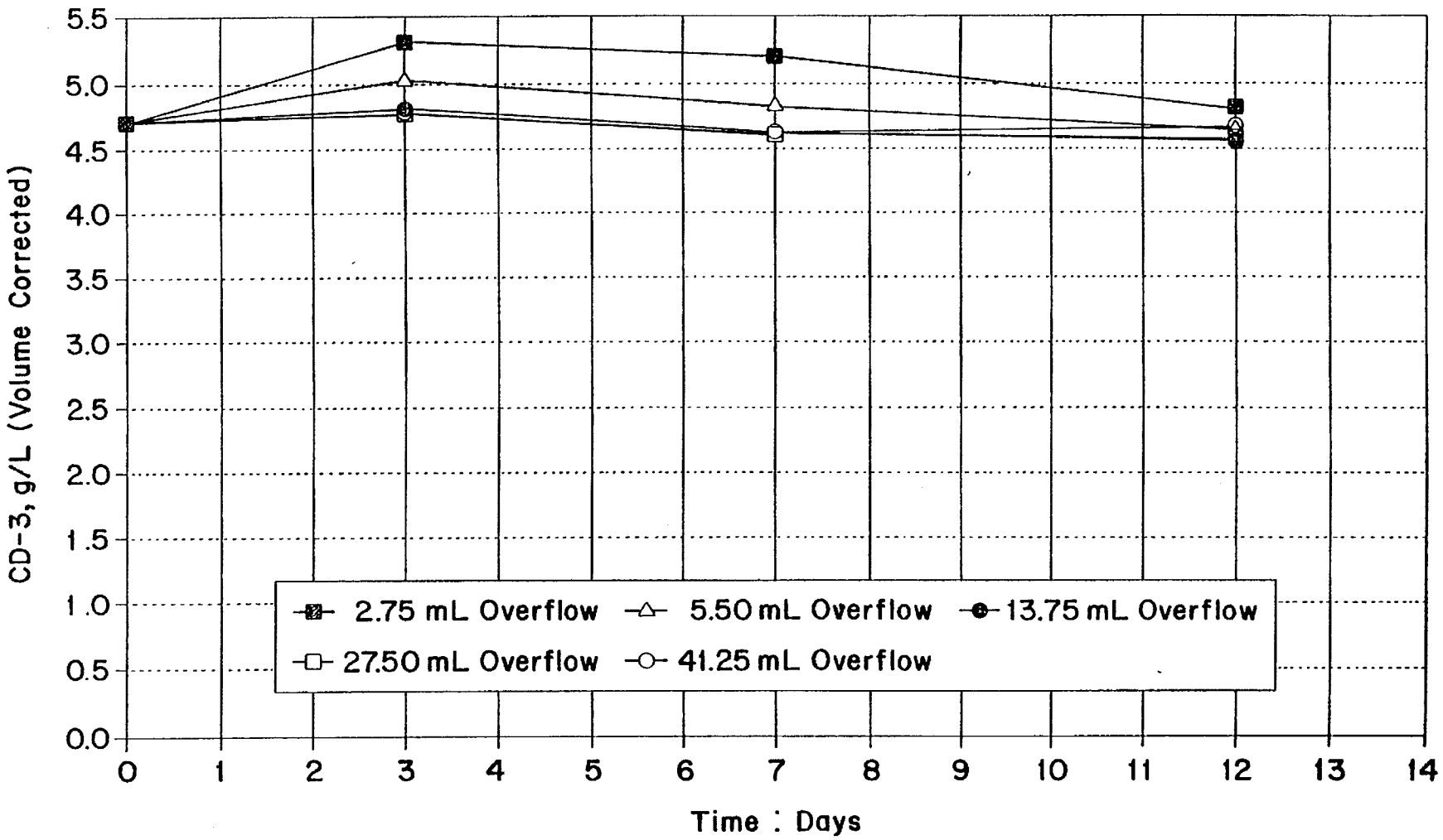

Finally, the regenerator concentrates are added through inlet 3, and mixed with the overflow solution previously transferred to replenishment vessel 8. FIG. 2D.

The regenerated solution is now ready to be returned to the working bath. It should be noted that the above sequence can be repeated as often as desired.

As is readily apparent, the present invention represents a significant advance in the field insofar as it renders developer recycling more technically and economically feasible. Moreover, it virtually eliminates the need to discard degraded overflow solutions thus reducing the need for either waste treatment or discharge.

Another significant accomplishment of the present invention resides in that the system can be virtually self-contained, for example, the vessel unit can be located near (or even over) the developer station of the color photographic processing machine.

The present invention will now be described in greater detail by reference to the following non-limiting examples.

EXAMPLE

In this example, the effect of preservative when in contact with a conventional developer overflow solution, from a color developing bath in a color development system was evaluated.

The following developer working solution, i.e., Fuji-Hunt RA-100, and developer preservation solution were employed:

| Developer Working Solution | |
|---|---|
| Component Name | Concentration g/l |
| Triethanolamine | 5.0 |
| Triethylene glycol | 5.0 |
| Aminocarboxylic acid chelate | 2.0 |
| Phosphonate chelate | 4.5 |
| Color Developer #3 | 4.5 |
| Sodium chloride | 2.0 |
| Potassium hydroxide | 7.5 |
| Potassium carbonate | 17.0 |
| Potassium bicarbonate | 5.0 |
| Sodium sulfite | 0.15 |
| Whitening agent | 1.0 |
| Potassium bromide | 0.05 |
| Diethylhydroxylamine | 2.0 |
| Sodium chloride | 0.1 |
| Triethylene glycol | 5.0 |
| Triethanolamine | 5.0 |
| Diethylhydroxylamine | 2.0 |
| Whitening agent | 1.0 |
| Surfactant | 0.01 |

A developer replenisher solution is introduced into the development bath and the resulting overflow samples from the developing bath were introduced into a 100 ml polyethylene, capped bottle containing the amount of preservative set forth in Table I below and allowed to stand for 12 days at room temperature, i.e., about 20°–30° C.

The amount of overflow was also varied to assess the effect of surface area disclosure to liquid volume on the stability of the color developing agent.

In this regard, the following overflow amounts were employed:

2.75 ml (5% of developer)

5.5 ml (10%)

13.75 ml (25%)

27.5 ml (50%)

41.25 ml (75%)

The amount of preservative added, in percent by weight, based upon the amount of the developer replenisher solution employed, was also varied in the manner illustrated in Table I. In order to illustrate the effect of the preservative on stability, a variety of amounts, i.e., 0, 50%, 100% and 200%, were tested as illustrated in Table I. The amount of color developing agent, i.e., CD-3, in the original solution at the end of 3, 6 and 12 days was the determined by liquid chromatography. The results associated with this example are set forth in Table I and in FIGS. 3A–3D.

TABLE I

| Overflow Volume Corrected (g/L) No Preservative Addition | | | | | |
|---|---|---|---|---|---|
| Storage period | overflow (ml) | | | | |
| (days) | 2.75 | 5.50 | 13.75 | 27.50 | 41.25 |
| 0.00 | 4.68 | 4.68 | 4.68 | 4.68 | 4.68 |
| 3.00 | 0.0391 | 0.0519 | 1.53 | 3.99 | 4.43 |
| 7.00 | 0.095 | 0.0441 | 0.0791 | 1.86 | 3.90 |
| 12.0 | 0.0235 | 0.0298 | 0.0423 | 0.60 | 2.01 |

TABLE I-continued

| 50% Preservative Addition | | | | | |
|---|---|---|---|---|---|
| Storage period | overflow (ml) | | | | |
| (days) | 2.75 | 5.50 | 13.75 | 27.50 | 41.25 |
| 0.00 | 4.68 | 4.68 | 4.68 | 4.68 | 4.68 |
| 3.00 | 4.44 | 4.29 | 4.40 | 4.59 | 4.60 |
| 7.00 | 3.23 | 3.57 | 3.89 | 4.26 | 4.42 |
| 12.00 | 0.92 | 2.75 | 3.15 | 4.02 | 4.27 |

| 100% Preservative Addition | | | | | |
|---|---|---|---|---|---|
| Storage period | overflow (ml) | | | | |
| (days) | 2.75 | 5.50 | 13.75 | 27.50 | 41.25 |
| 0.00 | 4.68 | 4.68 | 4.68 | 4.68 | 4.68 |
| 3.00 | 4.98 | 4.84 | 4.67 | 4.66 | 4.69 |
| 7.00 | 5.27 | 4.45 | 3.81 | 4.50 | 4.52 |
| 12.00 | 4.59 | 4.27 | 4.35 | 4.47 | 4.55 |

| 200% Preservative Addition | | | | | |
|---|---|---|---|---|---|
| Storage period | overflow (ml) | | | | |
| (days) | 2.75 | 5.50 | 13.75 | 27.50 | 41.25 |
| 0.00 | 4.68 | 4.68 | 4.68 | 4.68 | 4.68 |
| 3.00 | 5.32 | 5.03 | 4.81 | 4.77 | 4.76 |
| 7.00 | 5.21 | 4.83 | 3.63 | 4.60 | 4.61 |
| 12.00 | 4.81 | 4.65 | 4.57 | 4.60 | 4.67 |

As can be seen from the results in the table and figures, a significant increase in stability was conferred upon the color developer in the solution upon contact with the preservative tested.

Similarly, fixer and bleach fix containing overflows can be preserved against sulfurization upon contact with effective amount of suitable preservative, e.g., ammonium or alkali metal sulfites and/or thiosulfates, in a storage vessel.

While the invention has been described in detail and with reference to the specific embodiments thereof, it will be apparent to one skilled in the art that various changes and modifications can be made therein without departing from the spirit and scope thereof.

What is claimed is:

1. A method for storing and reusing processing solutions employed in a photographic processing system comprising:

(a) introducing a replenishing solution into a photographic processing bath;

(b) transferring an overflow processing solution from the photographic processing bath into a storage vessel and contacting the overflow solution with a preservative separately introduced to said vessel in an amount effective to prevent any substantial degradation in activity of said overflow solution during a storage period; and (c) therefore treating the stored solution to increase the activity thereof and reusing the treated solution at the end of said storage period.

2. The method according to claim 1 wherein (c) comprises introducing the stored solution back into a photographic processing bath.

3. The method according to claim 2 wherein the treatment of (c) comprises the introduction of fresh processing chemicals into said solution prior to reuse.

4. The method according to claim 2 wherein the entire amount of preservative needed to prevent substantial degradation in activity within the storage vessel is introduced into the storage vessel prior to (b).

5. The method according to claim 2 wherein the replenishing solution of (a) is introduced into the processing bath in an amount effective to provide the overflow solution of (b).

6. The method according to claim 2 wherein said method comprises conducting substantially all of said stored solution back into a photographic processing bath without any substantial discard.

7. The method according to claim 2 wherein the processing solution includes a color developer, a fixing agent, and/or a bleach-fixing agent.

8. The method according to claim 2 wherein the preservative comprises a pH buffer.

9. The method according to claim 2 wherein the preservative comprises at least one of hydroxylamine, hydrazine, ammonium or alkali metal thiosulfate, ammonium or alkali metal sulfite, and derivatives thereof.

10. The method according to claim 9 wherein the preservative is N,N-diethylhydroxylamine.

11. The method according to claim 9 wherein the preservative is triethanolamine.

12. The method according to claim 9 wherein the preservative is hydrazine diacetate.

13. The method according to claim 9 wherein said processing solution in said overflow storage vessel has a hydroxylamine concentration of about 0.05 M/l to 0.2 M/l per 0.01 M/l of a color developing agent present in the solution.

14. The method according to claim 9 wherein said processing solution in the storage vessel has a hydrazine concentration of about 0.005 M/l to 0.2 M/l per 0.01 M/l of color developing agent present in the solution.

15. The method according to claim 9 wherein said processing solution in said storage vessel has an alkylhydroxylamine concentration of about 0.001 M/l to 0.1 M/l per 0.01 M/l of a color developing agent present in the solution.

16. The method according to claim 2 wherein the processing solution comprises a color developing agent, the preservative comprises at least one of a hydroxylamine, hydrazine and derivatives thereof, and the processing solution is removed from and introduced back into the same photographic processing bath.

17. The method according to claim 2 wherein the processing solution is a fixing solution or a bleach-fixing solution, the preservative is an ammonium or alkali metal thiosulfate and/or sulfite and the processing solution is removed from and introduced back into the same photographic processing bath.

18. The method according to claim 1 wherein the overflow solution is introduced into an upper storage vessel and the replenisher is removed from a lower replenisher vessel, which vessels are arranged to fluidly communicate with each other.

19. The method according to claim 2 wherein the treatment of (c) further comprises the removal of deleterious byproducts from the processing solution.

20. The method according to claim 19 wherein halides are removed from the processing solution.

21. The method according to claim 2 wherein the storage period is from 2 to 6 weeks.

22. A method for regenerating a process solution in a photographic processing system comprising:

(a) providing a storage vessel comprising an upper vessel disposed above a lower vessel which vessels are arranged so as to fluidly communicate via a one-way valve, and which vessels are separately fluidly connected to a process bath of a photographic processing system, wherein the lower vessel contains a processing solution;

(b) introducing the processing solution from the lower vessel into the process bath of the photographic processing system;

(c) introducing overflow from the process bath to the upper vessel, wherein the upper vessel contains a preservative;

(d) opening the one-way valve to transfer the overflow to the lower vessel, and then closing the one-way valve;

(e) introducing regenerating components into the overflow solution; and (f) conducting the overflow solution back into the process bath.

23. The method according to claim 22, wherein the method further comprises:

repeating steps (b) through (f).

24. A method for regenerating developer solution in a color photographic processing machine, comprising:

(a) providing a storage vessel comprising an upper vessel disposed above a lower vessel, which vessels are arranged to fluidly communicate via a one-way valve, and which vessels are separately fluidly connected to a developer bath of a photographic processing machine, wherein the lower vessel contains a developer solution;

(b) introducing the developer solution from the lower vessel into the developer bath;

(c) introducing the overflow from the developer bath into the upper vessel, wherein the upper vessel contains a preservative selected from among hydroxylamines, or hydrazines and derivatives and/or mixtures thereof;

(d) opening the valve to transfer the overflow to the lower vessel, and then closing the valve;

(e) introducing regenerating components into the overflow solution; and (f) introducing the overflow solution back into the developer bath.

25. The method according to claim 24, wherein the method further comprises:

repeating steps (b) through (f).

* * * * *